United States Patent
Stone

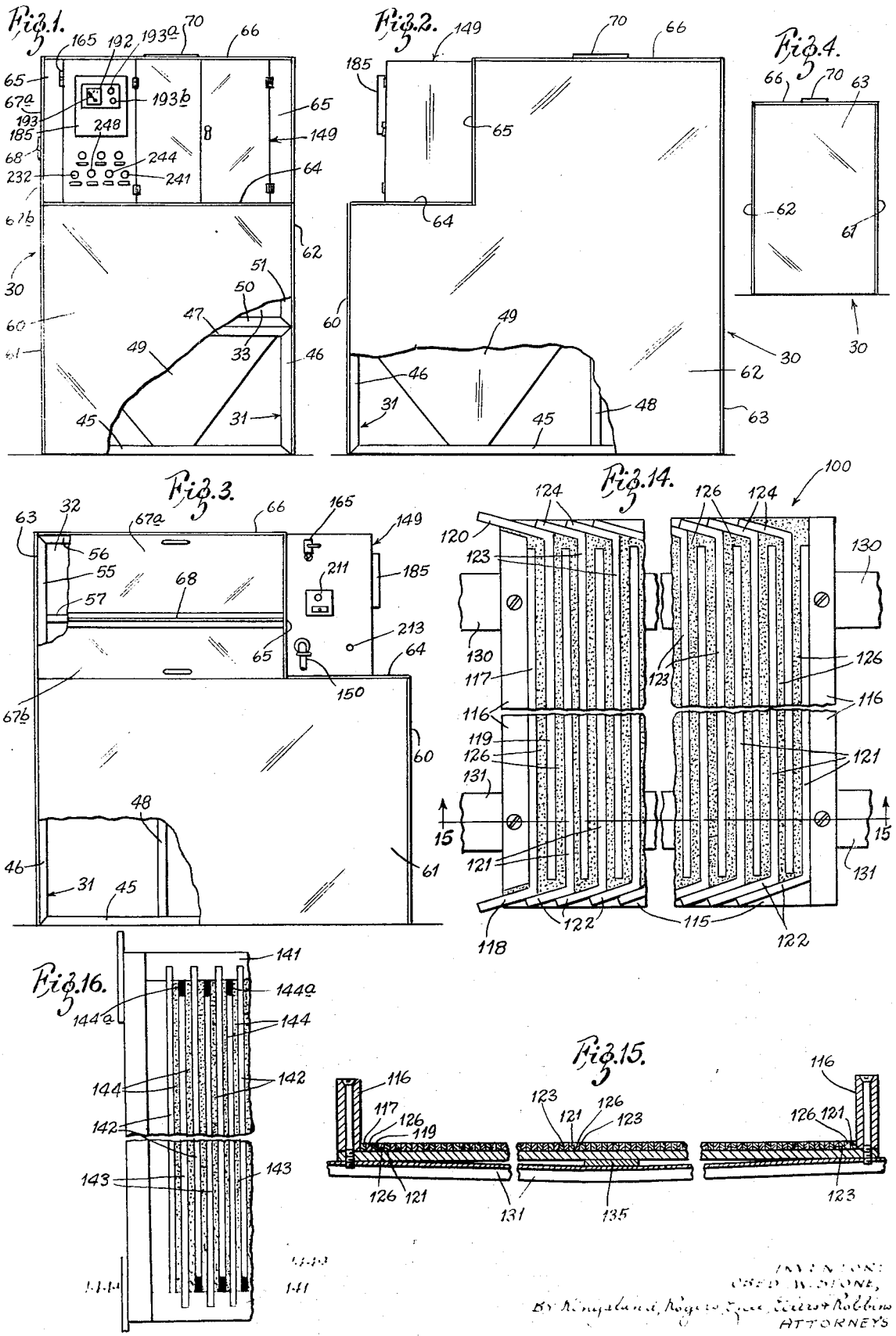

[15] 3,685,431
[45] Aug. 22, 1972

[54] MACHINE FOR KILLING INSECTS

[72] Inventor: Obed W. Stone, 425 S. Gore Ave., Webster Groves, Mo. 63119

[22] Filed: Oct. 29, 1969

[21] Appl. No.: 872,233

[52] U.S. Cl. ..................... 99/253, 21/102 R, 43/132
[51] Int. Cl. ........................... A23b 9/00, A23l 3/32
[58] Field of Search ....21/102, 54; 99/219, 221, 250, 99/253, 274; 43/132, 144

[56] References Cited

UNITED STATES PATENTS

| | | | |
|---|---|---|---|
| 2,191,816 | 2/1940 | Conley | 21/102 X |
| 2,373,428 | 4/1945 | Stone | 21/102 |
| 2,661,512 | 12/1953 | Kretschmar | 21/102 |

*Primary Examiner*—Morris O. Wolk
*Assistant Examiner*—D. G. Millman
*Attorney*—Kingsland, Rogers, Ezell, Eilers & Robbins

[57] ABSTRACT

Machine for killing insects in a stream of grain or finely divided food, the grain flowing down into the machine onto a distributor for even spreading over a plurality of angle deflectors, and by them directed downwardly and forwardly onto a plurality of angularly disposed grids. In flowing over the electrified grids, insects are electrocuted. From the grids the material flows into a hopper and back into the stream. Anti-explosive atmosphere is maintained in the machine by a sequencing control, to feed in non-combustible gas in regulated quantities to maintain the oxygen content within 5–10 percent, preventing starting and electrification of the machine until a test arrangement finds the oxygen content reduced below 10 percent, and thereafter feeding $CO_2$ at rates to continue reduction to 5 percent, and then maintain it between 5 and 10 percent oxygen.

8 Claims, 26 Drawing Figures

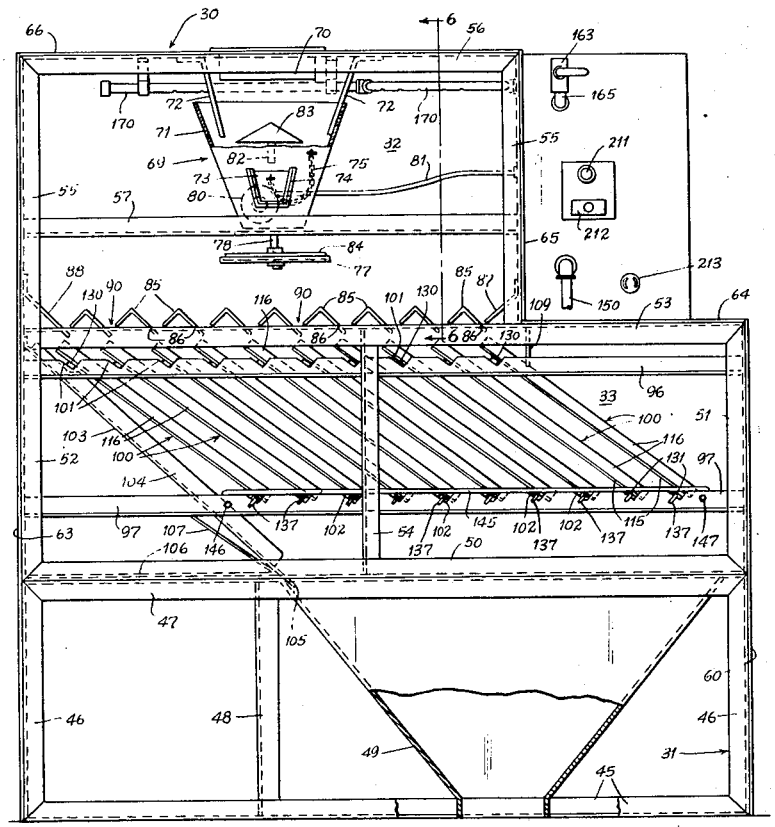

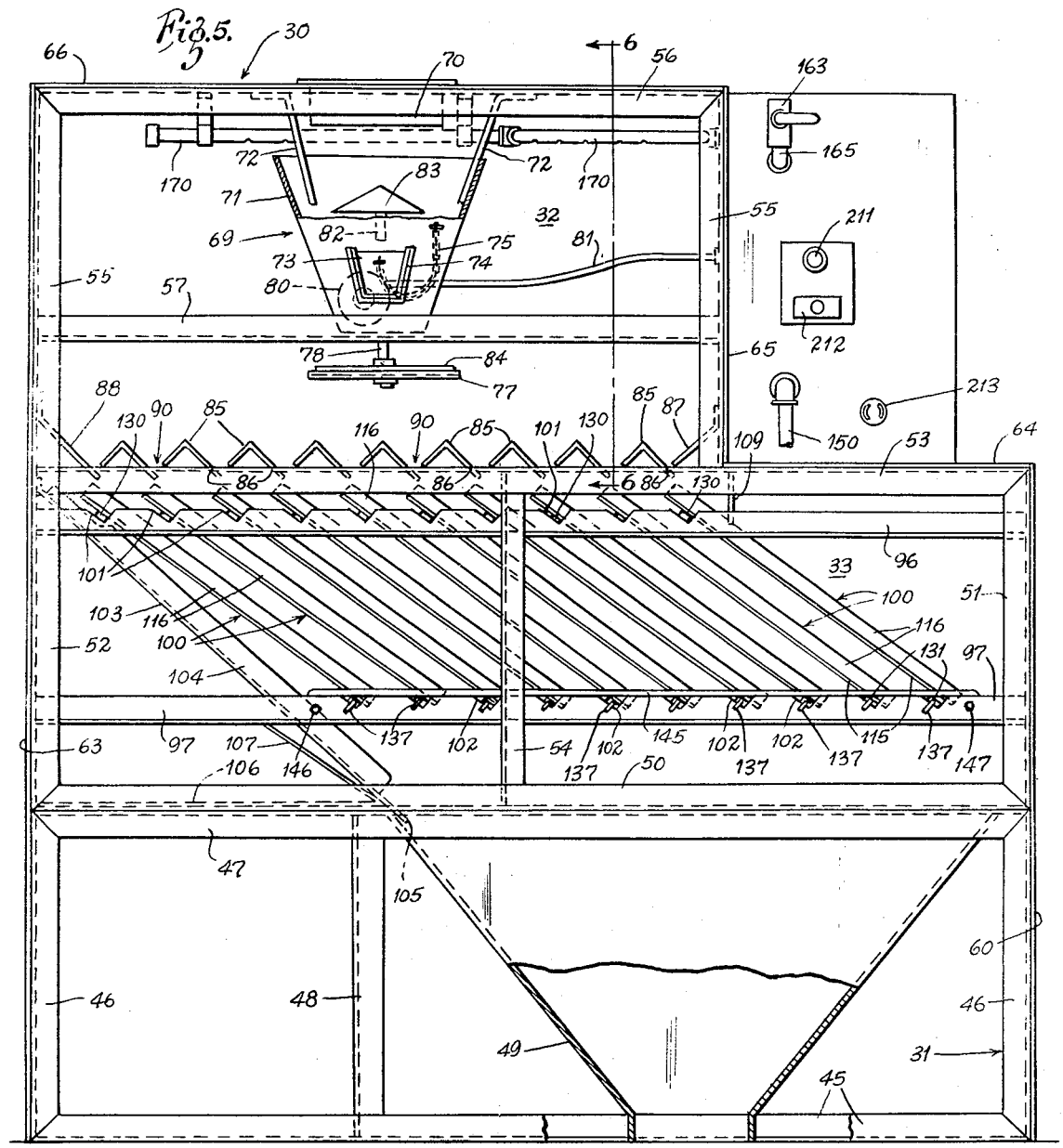
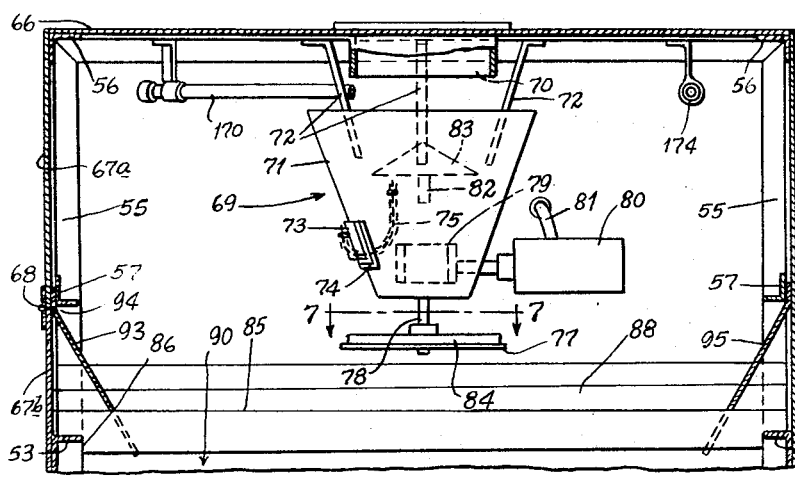
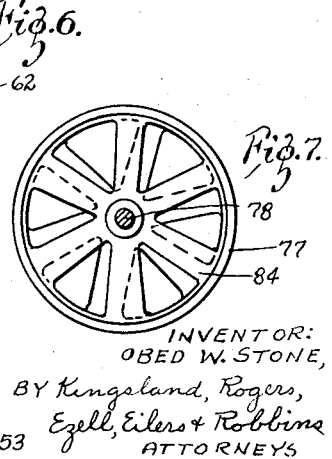
INVENTOR:
OBED W. STONE,
BY Kingsland, Rogers,
Ezell, Eilers & Robbins
ATTORNEYS

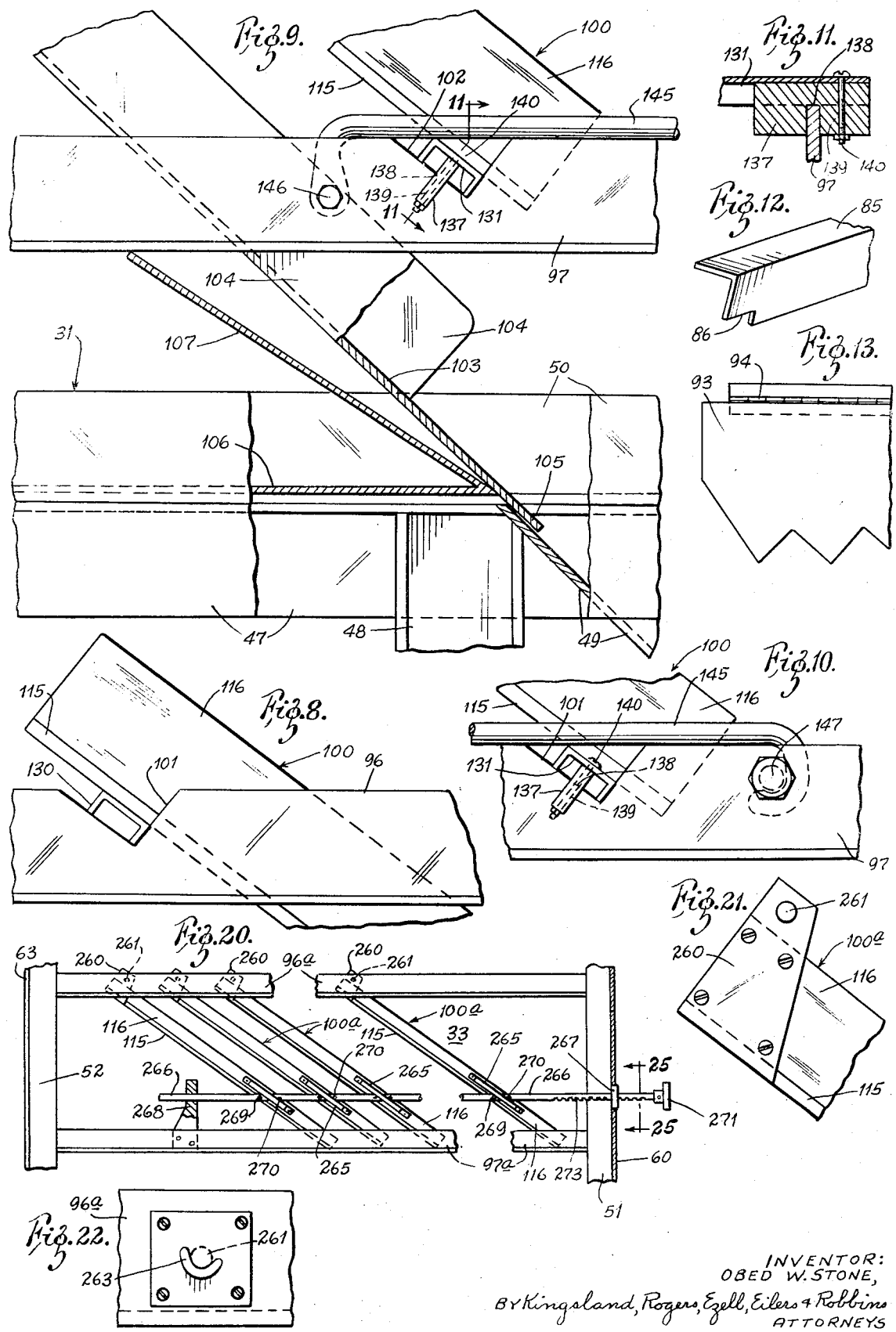

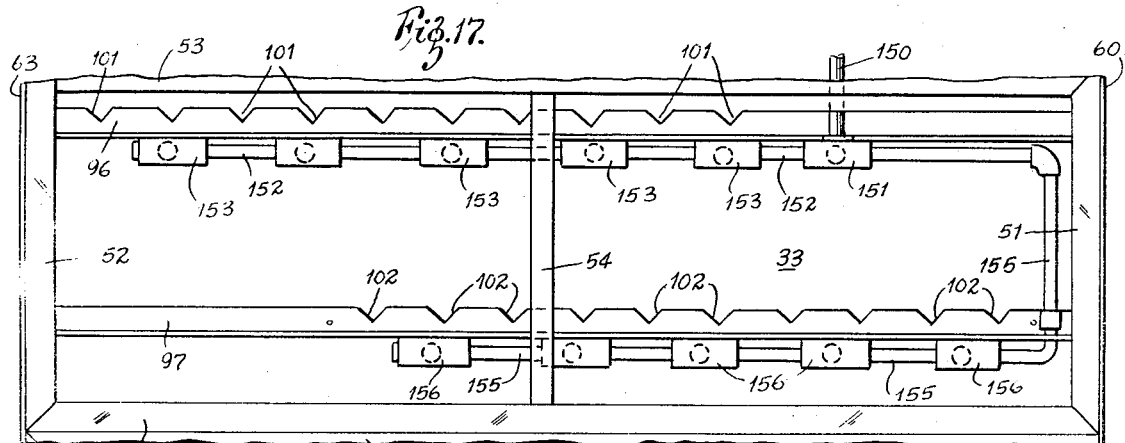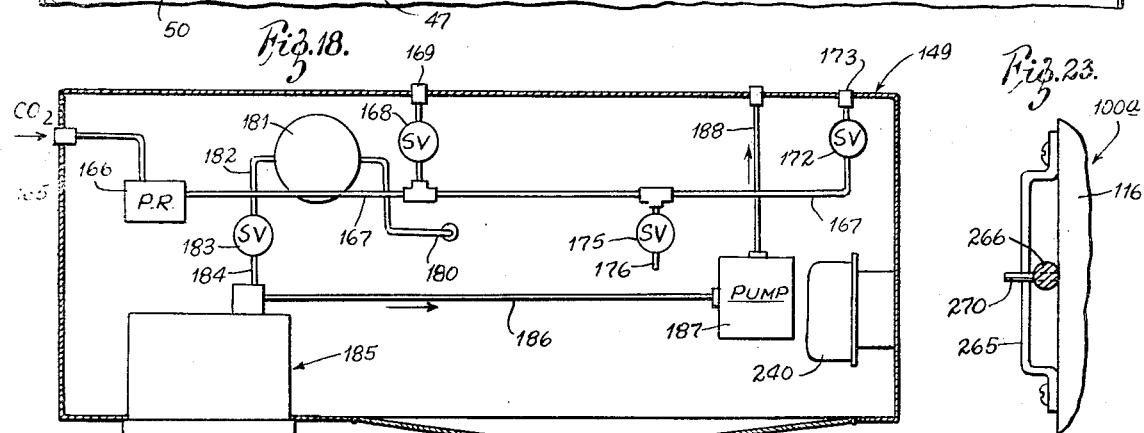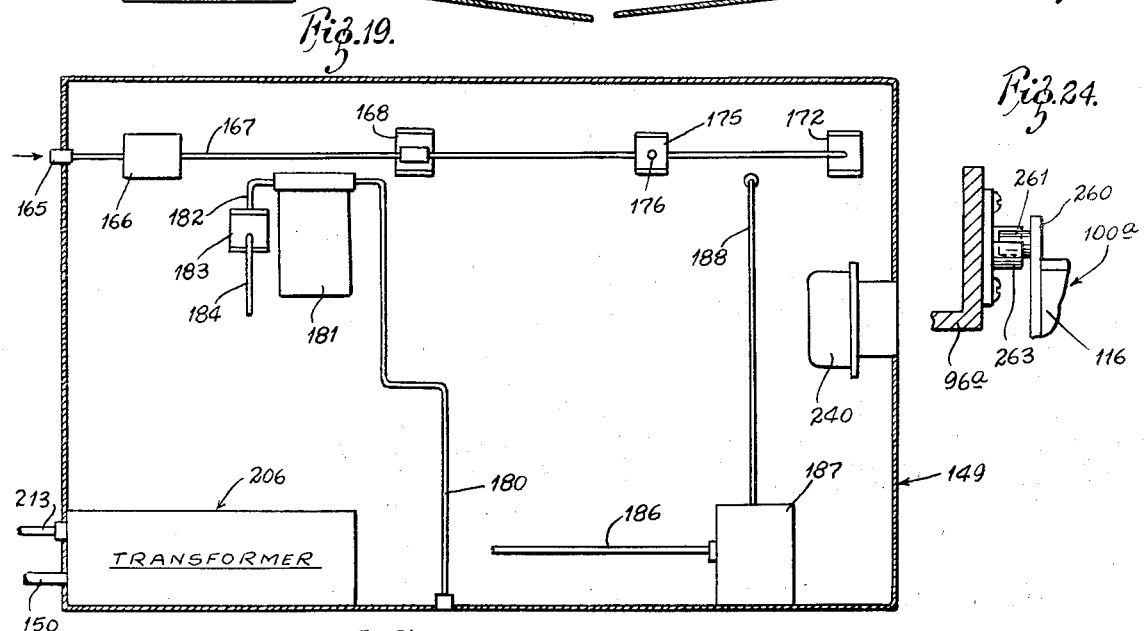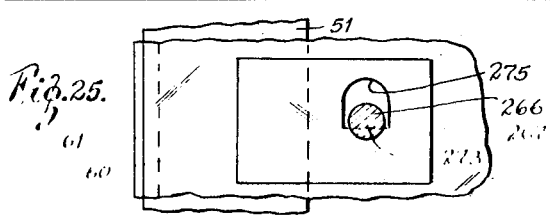

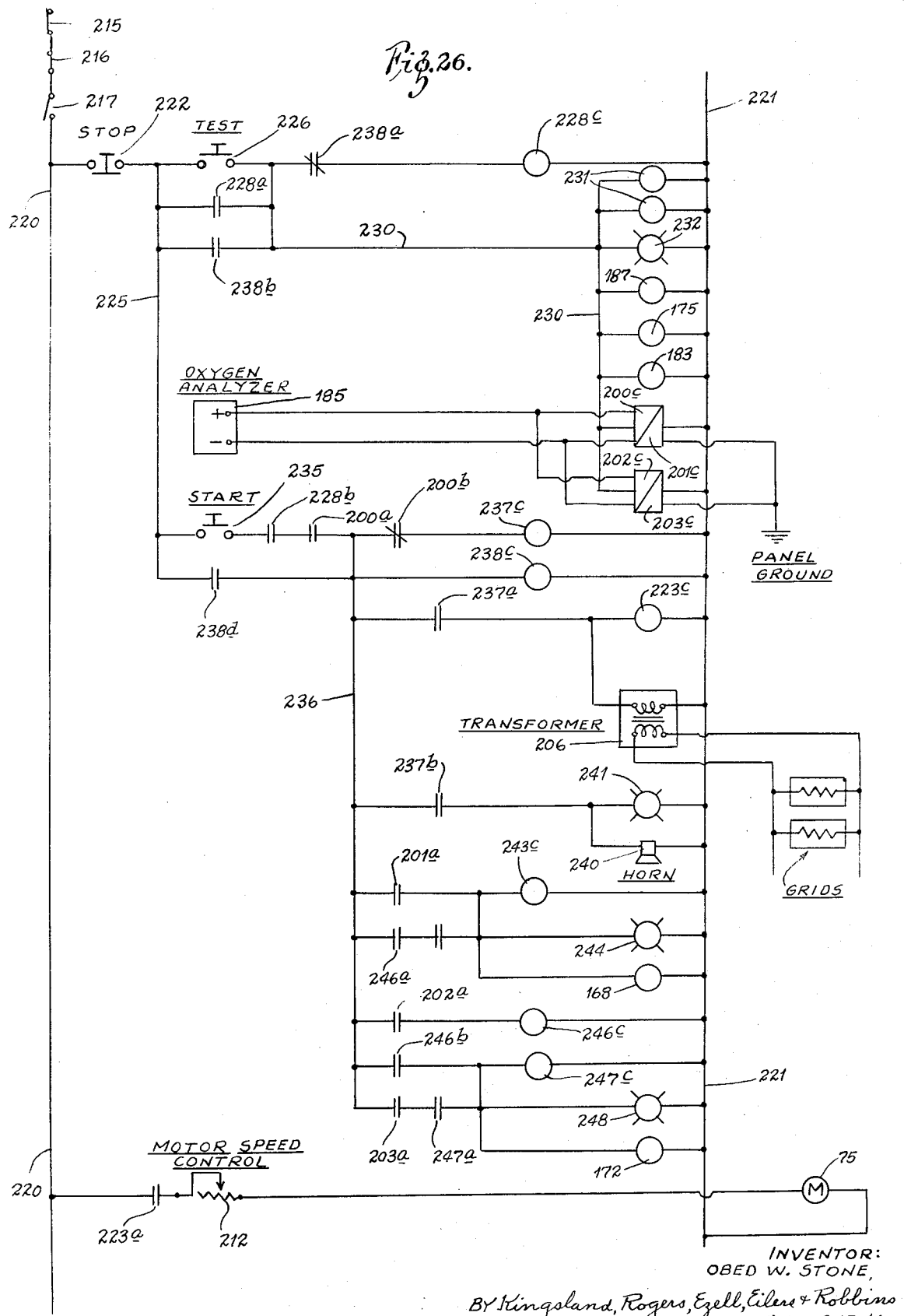

MACHINE FOR KILLING INSECTS

BACKGROUND OF THE INVENTION

The invention is in the field of treating grain and similar and related foods to kill insect life therein. It may be used in connection with mills, elevators, etc., particularly where the material is stored or processed in bulk.

Relevant prior art includes prior U.S. Pat. No. 2,373,428 of this same inventor, and U.S. Pat. No. 2,661,512 to Kretschmar, and citations therein. The present invention provides better distribution of the material, greater capacity per cubic foot of machine, better atmosphere control and safer operation.

SUMMARY OF THE INVENTION

In the method and machine such as described, the use of a power-operated spreader capable of being energized and deenergized to control at various required speeds the flow through the machine and to spread the material fairly evenly over a plurality of transverse inverted angles. These angles constitute means to direct the material downwardly and forwardly through slots onto a plurality of forwardly and downwardly sloping grids. The grids are molded or otherwise formed into units, and are parallel, and slope downwardly to make the material roll over them, by gravity, a sufficient distance to cause electrocution of the insect life in the material. The angularity of the grids may be adjustable.

The operation of the machine is under control of a continuous oxygen analyzer that constantly senses the proportion of oxygen in the atmosphere in the machine while in operation. A plurality (here two) solenoid valves inject $CO_2$ (or other inert gas) into the machine, and are controlled by the analyzer to provide maximum inflow of gas when the oxygen content is high, diminishing inflow where it is low, and stopping it when it reaches an adequate minimum. To prevent hunting, the valves are caused to open and to close at different values of oxygen content.

The control also prevents energization of the electrical components, particularly the grids, until the oxygen content is safely low, since whole or processed grain and flour can contain explosive dust. At the same time it stops the spreader-feeder, so that the machine will not transmit material without treating it.

In the drawings:

FIG. 1 is a front elevation of the machine, partly broken away to show interior construction;

FIG. 2 is a right-side elevation, also partly broken away;

FIG. 3 is a left-side elevation, also partly broken away;

FIG. 4 is a rear view on a reduced scale;

FIG. 5 is an enlarged left-side elevation with the cover panels of the main cabinet removed;

FIG. 6 is a vertical section of the upper portion of the machine, taken on the line 6—6 of FIG. 5;

FIG. 7 is a somewhat schematic view of the spreader disk to show its adjustment, the view being taken as indicated by the line 7—7 in FIG. 6;

FIG. 8 is an enlarged view of the upper end mounting of one of the grids;

FIG. 9 is an enlarged view, partly in section, of the lower end of one of the grids and its support and associated components;

FIG. 10 is an enlarged view of the hold-down arrangement for the lower end of the grid;

FIG. 11 is a sectional view of the interfitting means to hold the lower end of a grid, taken on the line 11—11 in the upper part of FIG. 9;

FIG. 12 is a view of the end of one of the distribution angles that are located at the bottom of the upper section of the machine;

FIG. 13 is a view of one end of one of the side baffles adapted to be used over the top of the distribution angles;

FIG. 14 is a view, partly broken away, of the top face of one of the grids;

FIG. 15 is a reduced scale sectional view taken on line 15—15 of FIG. 14 showing shim means to compensate for sagging of the members whereby the grid surface can be maintained flat and horizontal, parts being exaggerated for clarity;

FIG. 16 is a view of an alternative arrangement for the grid;

FIG. 17 is a view of the left side of the machine with the outer panels removed to illustrate primarily the electrical conduit arrangement;

FIG. 18 is a section taken just below the top of the control box;

FIG. 19 is a vertical section from side to side through the control box;

FIG. 20 is a view of the left side of the grid portion of the machine with the outside panels removed and parts in section to illustrate an adjusting means for the grid angle;

FIG. 21 is a view of the upper end of one of the grids in the modification of FIG. 20;

FIG. 22 is a view of a hanger for the grids of FIG. 20;

FIG. 23 is a sectional view of the adjusting rod and associated parts for the grid arrangement of FIG. 20;

FIG. 24 is an elevation, partly in section, of the hanging means for the adjustable grids of FIG. 20;

FIG. 25 is a view taken on the line 25—25 of FIG. 20 showing the latching means for the grid adjusting member; and FIG. 26 is a schematic wiring diagram of the machine.

The control requires the start to be preceded by operation of a test check circuit that starts the analyzer and holds it in operation (and also supplies $CO_2$ to the control box itself). Unless this circuit to the analyzer is operated, the machine starting circuit cannot be energized even though the starting switch is closed. However, subsequent momentary operation of the starting switch establishes the start of operating circuitry that holds the analyzer circuit operation until a stop switch is actuated. The operating circuitry regulates energization of the grids, the $CO_2$ valves, the feeder, and appropriate alarms as functions of the oxygen content of the atmosphere inside the machine.

The machine is designed to be interposed in a conduit system for the flow of grain, whole kernels or processed. It consists of a cabinet or receptacle housing 30 formed of a metal framework and sheet metal (where reference is made to metal, it is understood ordinarily to refer to steel or other strong material that usually is electrically conductive) enclosing panels to provide a housing wherein a controlled atmosphere may be maintained. The receptacle 30 is mounted on a base 31. The receptacle 30 is divided into an upper grain distribution chamber 32, and an intermediate insect-killing chamber 33. The base 31 provides a lower or discharge portion, as will appear.

The frame-like base 31 may comprise a lower rectangular horizontal metal frame section 45 of angle members adapted to rest on a floor or other support, with vertical corner angle irons 46 upstanding therefrom, one at each of the four corners. Surmounting the latter is an upper horizontal rectangular metal framework 47 made of angle members. Intermediate vertical angle members 48 can be provided on each side between the front and rear to give rigidity. A collecting and discharge hopper 49 is mounted in the bottom frame.

The cabinet 30 has a frame of metal angle members, with a lower horizontal frame 50 that, in this illustration, is coterminous with the upper horizontal frame 47 of the base or frame 31 and is secured appropriately thereto. The frame 50 has vertical angles 51 at the two forward corners that extend upwardly for an intermediate distance, and rear corner angles 52 that extend upwardly a greater distance. An intermediate horizontal rectangular metal frame 53 made of angle members is welded or otherwise attached to the tops of the vertical angles 51, and intermediate the ends of the rear angle columns 52. Vertical bracing metal angles 54 are located between the front and the rear, and are welded to the lower and upper frame components 50 and 53. These are employed for greater rigidity, and also have grid supporting function.

Upper vertical angles 55 extend from the upper horizontal frame component 53, set back somewhat from the front thereof. The top frame component consists of a rectangular metal frame structure 56 secured to the upper ends of the vertical angles 52 and 55. There are horizontal reinforcing metal angles 57 horizontally arranged on opposite sides of the framework between the vertical angles 55 and 52.

Sheet metal panels are firmly secured, as by strong bolts, to the frame of the enclosure 30, in a manner to be essentially airtight for a purpose to appear, and to make it difficult to open the cabinet when the machine is operating. These include a lower front panel 60, a lower left side panel 61, a right side panel 62, a rear panel 63, a forward horizontal shelf panel 64, an upper front panel 65, and a top panel 66. There is an upper left side panel made of two sheet metal door panels 67a and 67b joined by a piano hinge 68 adjacent the horizontal frame angle 57. The hinge enables the upper panel 67a to be opened downwardly and the lower door panel 67b to be opened upwardly. Handles are shown to aid in opening and closing the doors. When the machine is readied for use, the door panels are firmly bolted in closed position. Each door panel on the machine operates a door switch that automatically opens whenever a door is opened, as will appear.

The upper section 32 of the machine is a grain receiving and distributing chamber. Its top panel 66 supports a distributor 69, which has centrally interposed therein a circular collar 70 which may be connected to a grain conduit and which constitutes an inlet means by which grain is introduced into the distribution chamber 32 of the machine. In that chamber just below the inlet 70 a frusto-conical hopper 71 is hung by straps 72 from the top panel 66. This hopper 71 has a removable inspection gate 73 in its lower part, that fits in downwardly tapering tracks 74 on the outer surface of the hopper 71. A chain 75 joins the hopper and the gate to prevent the gate from being dropped into the mechanism.

The distributor 69 includes a spreader disk 77 mounted on a vertical shaft 78 that is appropriately supported within the hopper. This disk may be rotated by a worm gear arrangement in a gear box 79 mounted in the hopper 71 and operated by an explosion-proof electric motor 80. The motor 80 is supported on the side of the hopper, with an explosion-proof electrical conduit 81 leading through the wall 65 of the machine.

Upstanding also from the gear box 79, within the hopper 71, is a fixed rod 82, at the top of which there is a cone 83 that acts to deflect grain descending through the inlet 70 to the hopper 71, and prevents it from impinging onto the disk 77 with excess momentum. The upper slope of the cone 83 is sufficient to ensure that the grain will not remain static on it, but will fall to the bottom of the hopper.

The spreader disk 77 is of the adjustable slot type, with an upper concentric disk 84. Each disk has sectorially shaped slots. The upper disk 84 is mounted within an outer rim on the lower disk and may be fixed in a selected angular position in the lower disk providing slots of selected sizes. This is a familiar type of adjustment arrangement to control the sizes of the slots and need not be described in detail.

When grain or grain particles are introduced through the inlet 70 and fall upon the rotating disk 77, it is thrown outwardly and downwardly substantially evenly from the center of the shaft to the outside limits of the distribution chamber 32, where it falls upon a plurality of distribution angles 85 that are located across the bottom of the chamber 32.

In the machine illustrated there are nine distribution angles 85 disposed with uniform spacing across the lower part of the chamber 32. The angles 85 are inverted and span between the opposite sides of the frame 53 with their back edges resting on the top of the frame. Their forward faces are wider than their rear faces, with the forward corners notched at 86 (FIG. 12), to permit the forward edges to extend downward somewhat between the sides of the frame 53 to a level below their rear edges. Typically, the upwardly disposed apexes of adjacent distribution angles 85 may be about 5⅛ inch apart for the machine size illustrated, while each angle is 54½ inches long with the faces 4 inches and 3 inches wide, respectively. As shown, the angle faces are at 90° to each other. However, for finer materials they should be steeper (such as at 60°) so as to prevent a build-up of the materials on them.

It is evident that there are a plurality of horizontal slots 90 extending from side to side of the machine between the several distribution angles 85.

At the bottom of the distribution chamber 32, there is a baffle 87 extending across the machine between the frame angles 55 constituting means to deflect grain rearwardly to the first angle 85; and at the rear of the machine there is a similar means in the form of a baffle 88 that extends forwardly. The baffles and angles thus provide 10 slots 90 (in this illustrative machine) through which the grain may descend with a forward impetus given by the underhand of the front faces of each of the angles 85.

In addition to the forward and rear baffles 87 and 88 there are means in the form of side baffles designed to direct the grain inwardly away from the ends of the distribution angles 85.

Viewed from the front, there is a left-side baffle 93, hinged by a piano hinge 94 at its top edge to the inner and upper edge of the door panel 67b so as to swing out when the door is opened. The lower edge of the baffle 93 is notched to interfit with the upper surfaces of the angles 85 and the baffles 87 and 88. The hinge 94 permits the baffle 93 to be swung upwardly to give ready access to the spreader 69 and the angles 85.

The right-side baffle 95 is similar in construction and mounting, but may be made within the hinge. Its upper edge is secured to the other frame angle 57. These several baffles are used to restrict accumulation of material on the horizontal structural surfaces of the machine.

The grain passing through the slots 90 flows from the distribution chamber 32 into the insect-killing chamber 33 which contains electrical grids 100 sloping downwardly and forwardly therein, one below each slot 90. These grids will be described in detail hereafter. Two forms of grid mountings are illustrated herein; one provides a fixed slope for the grids and the other an adjustable slope. There are upper grid support rails 96 and lower grid support rails 97, extending between the vertical angles 51 and 52 on each side of the machine frame. The angle rails 96 and 97 are disposed to have vertical faces and outwardly extending horizontal faces. There are a series of notches 101 in the upper side rails 96 and a corresponding but forwardly displaced series of notches 102 in the lower side rails 97. Each grid 100 is supported from the side rails, and extends between corresponding notches 101 and 102 so as to be disposed in a sloping direction, downwardly and forwardly.

Below the rearmost grid 100 there is a baffle plate 103 having its upper edge secured to the surface of the angle of the horizontal frame 53 across the back of the machine. The baffle 103 has side flanges 104 on it that fit against the inner surfaces of the vertical faces of the rails 96 and 97. It has a lip portion 105 projecting into the hopper 49.

There is a floor or plate 106 that closes the bottom of the insecticide chamber 33 below the baffle 103 from the back to the hopper 49. This bottom plate 106 has an upwardly and backwardly turned flange 107 that fits under the lower edge of the baffle 103 (FIG. 9).

The horizontal sides of the two sets of rails 96 and 97 are fitted into notches in the vertical beams 54 in order to give greater rigidity to the support of the grids.

The grain distributed by the spreader 77 over the angles 85 descends by gravity through the slots 90, one slot being over the upper end of each of the grids 100. The grain falls through the bottom opening of the machine into the hopper 49. Material falling through the slots 90 is directed onto the grids, and is confined by the underside of the adjacent grid. A depending plastic sheet 109 is provided at the top of the forward grid, being hung from the frame 53. It confines the material falling through the forward slot 90 to the surface of that grid. Such sheets may be used on all the grids if desired.

One of the grids, partly broken away, is illustrated in FIG. 14. The grid includes a floor 115 that is made of insulative material, such as a tempered laminated paper; in the machine illustrated, the grid floor is of new melamine and is 30 × 48 × ¼ inches thick. Two side rails 116 are firmly secured to the edges of the floor 115, and project upwardly therefrom. These side rails are of wood, such as red oak, and, in the illustrated machine, are three-fourths inch by 2 inches by 29 inches. The downward dimension of the grids is sufficient to insure that insects will contact the surface and not miss it because of turbulence or the like. The rails are fastened to the floor 115 by screws countersunk to avoid all possibility of electrical short circuits.

The electrical portions of the grid include conductive bars alternately connected to have opposite polarity. The bars are spaced apart by a predetermined distance and held in spaced relationship by interposed non-conductive plastic such as an epoxy resin, cast around the bars to make the bars and table into a unit, with alternate bars spaced from each other by the insulation material. Alternately, the bars may be spaced by dry melamine strips tightly fitted and clamped between the bars, and insulating the bars from each other.

The two bars 117 and 119 nearest one side are the terminal bars and have longer bent ends to provide for electrical connections. Bar 117 is set flatly against the inner face of the wood rail 116 and has its end 118 bent at an angle of approximately 105°, projecting out from the end of the grid. The other terminal bar 119 has a similar end 120 that projects from the other end of the wood rail 116.

There are a plurality of grid bars 121 of the same polarity as the bar 117, all with ends 122 extending from the same side of the grid and bent at the 105° angle. The bars 121 have their ends 122 in overlapping contacting relationship as illustrated. All of these ends 122 are soldered together to insure that an electric potential brought to the projecting terminal end 118 will be immediately conducted to all of the ends 122 and all the conductive grid bars 121.

The alternately interposed grid bars 123 of opposite polarity have their ends 124 at the opposite side of the grid bent at the 105° angle, overlapping in electrical contact and soldered together, so that the opposite potential applied to the terminal 120 will be instantly applied to all of the grid bars 123.

The bars 121 and 123 are bent to provide the overlapping ends. The grids can be made from ⅛ inch square free-cutting brass bars thoroughly cleansed of all foreign material including the factory finish, and without burrs or bulges. For some grains, the bars are spaced about one-eighth inch apart; for more powdery materials, they could be closer, such as 0.050 inch. The actual spacing is determined by the nature of the material being treated, and by the insects being electrocuted.

The bars 121, 123 are firmly located in place on the floor 115, after which, as shown at 126, a plastic filler material, preferably an epoxy, such as REN DC–84–66 of Ren Plastics Co., is poured around them to hold them tightly and evenly in spaced relation. After the epoxy has set for sufficient length of time to be completely free of tackiness, the entire top surface of the grid is sanded as with a number 50 sanding belt.

This must be done in a manner to avoid pressing any slivers of metal into the resin, as the same might cause short circuits. All brass bars will show metal.

After the grid assembly aforesaid has been completed, two elongated channel members 130 and 131 are attached to the underside of each grid. In the illustrated machine, these channel members are 1 inch by one-half inch and 54 inches long. In assembling the channel members beneath the grid floor, metal support shims or lugs 135 are inserted between the middle of each channel member and the floor. The shims apply a somewhat resilient force upwardly on the middle of the floor of each grid at its upper and lower portions, and counteract its tendency to sag in the middle. Typically, the floor support shims may be 1 inch by 2 inches by ¼ inch pads welded to the tops of the several channels.

As is evident from FIG. 5, the several grids are installed by having their channels 130 and 131 placed in corresponding notches 101 and 102, respectively, of the upper rails 96 and the lower rails 97. Prior to their being installed, a stabilizing block 137 is fastened into one end of each lower channel 131. Each block 137 has a notch 138 and a bolt hole 139. The block fits with reasonable closeness into the channel 131 and is secured therein by a bolt 140 passing through the hole 139 and a corresponding hole in the channel 131. The notch 138 then fits over the vertical flange of the horizontal frame 97 to hold the grids securely against lateral movement.

As an alternative to the plastic molded grids, they may be made in the form shown in FIG. 16. There a grid is made similarly to the foregoing, but instead of casting a resin between the straight conductor bars, dry laminations are placed between them, and the wood side rails are substantially the same as before. Top and bottom slotted bus bars 141 are secured to the floor. First conductors 142 have their upper ends secured in the slots in the upper bus bar 141 and extend downwardly in equally spaced parallelism and terminate short of the lower bus bar 141. Second conductors 143 are alternated between the first ones and are secured in the slots of the lower bus bar 141. Non-conductive strips 144 of material such as dry formica are located tightly between the conductors. To keep the ends of each set of conductors insulated from the opposite bus bar, epoxy or like resin is cast into the gaps between the ends of the bars and the opposite bus bar, as shown at 144a.

The alternative arrangement avoids the need for careful sanding of the assembly of bars and epoxy, which has the difficulties of tending to cause the epoxy to become heated and spongy, and tending to produce slivers of conductor metal that may short circuit the grid.

In this alternative, electrical connections to the bus bars are made in the evident way to oppositely charge the alternate conductors.

On the two opposite sides of the grids 100, at their lower ends, are hold-down bars 145. Each hold-down bar 145 has a hook at its rear end secured pivotally over a bolt 146; and at its forward end has a bent-down eye that receives a bolt 147. Thus the hold-down bars 145 span the laterally projecting ends of all the lower channels 131, thereby securing the grids in place. Upon removal of the bolts 147, the hold-down bars 145 may be lifted and the grids removed by being lifted out of their notches 101, 102.

As previously noted, the opposite sets of conducting bars of each grid have terminal ends 118 and 120 projecting beyond the floor 114. The grids are installed with these terminals 118 and 120 all disposed to the left side of the illustrated machine, the terminals 118 being at the bottom of the grids and the terminals 120 at the top. FIG. 17 shows explosion-proof conduits and terminal boxes for wiring of the grids.

As shown in FIGS. 2 and 3, there is a control box 149 mounted on the shelf panel 64 at the front of the machine. Wiring is brought by a conduit 150 from the interior of the control box 149 into a junction box 151 located within the electrocution chamber 33 (FIG. 17). Conduit means 152 are connected into five terminal boxes 153. Each box 153 has an opening to admit leads from the terminal ends 120 of two adjacent grids. The wiring is sealed into the openings to prevent flame from entering the conduits from inside the machine, and vice versa.

Also, conduit means 155 lead from the junction box 151 into five terminal boxes 156 located below the rail 97. Each box 156 has an opening for two wires to two terminals 118 of two adjacent grids. All of these boxes and conduits are sealed and explosion-proof. They are mounted on the frame rails 96 and 97. The electrical controls for the grids will be described hereinafter.

Means is provided to supply carbon dioxide gas (or other appropriate inert gas) to the interior of the cabinet to maintain the oxygen content sufficiently low to prevent combustion. The inside atmosphere is maintained between 5 and 10 percent oxygen.

The $CO_2$ gas is introduced from some suitable source through a control valve 163 and an inlet pipe 165 into the control box 149 that is secured onto the forward upper shelf-panel 64. The $CO_2$ will normally flow to the machine under pressure, and through a pressure regulator 166 that is supported inside the control box 149. The regulator is adjustable so that the proper rate of flow can be maintained.

From the pressure regulator 166, $CO_2$ is carried by a conduit 167 to three outlets. The first outlet is through a solenoid valve 168 to a connection 169 leading to a pipe 170 that extends out into the upper part of the chamber 32, the same being supported from the top of the chamber by appropriate hangers. The second outlet from the pipe 167 is through a second solenoid valve 172 that has a connection 173 to a pipe 174 that also extends across the top of the chamber 32 and is suspended from the top thereof. The two pipes 170 and 174 are provided with a series of ports through them so that $CO_2$ gas is distributed over the top of the interior of the machine. The ported pipes 170 and 174 are intended to typify discharge means capable of distributing the gas throughout the chamber. In some cases where clogging is possible from dusty particles present, the pipes may be shortened down to become spray nozzles adjacent the sides of the machine, since they provide velocity and pressure conditions that aid in preventing clogging.

The third outlet from the pipe 167 is through a solenoid valve 175 having a discharge outlet 176 opening into the interior of the control box 149. Since gas is normally present under pressure in the pipe 167, whenever any solenoid valve is opened the gas will flow out through its respective pipe and be delivered to the enclosure into which it discharges.

A continuous sampling arrangement for checking the interior atmosphere within the machine is provided. This has a sample inlet pipe 180 that opens through the bottom wall of the control box 149 and into the chamber 33, with dip tube if desired. The pipe 180 leads to a filter 181 and thence by a pipe 182 through a solenoid valve 183 the outlet 184 of which connects into a chemical oxygen analyzer 185. This analyzer is a commercial device adapted to sense the percentage of oxygen present in the sample, and typically may be a membrane cell electro-chemical oxygen analyzer. The outlet of the analyzer is connected by a pipe 186 into a sample pump 187. This pump draws sample atmosphere from the interior of the machine through the filter, solenoid and analyzer, and discharges through a pipe 188 into the upper chamber 32. This pump operates continuously while the machine is operating.

In FIG. 1, analyzer 185 also has a knob 193a which must be turned clockwise to energize the analyzer. There also is a second knob 193b which is a spanner-knob to calibrate the dial pointer to 21.8 percent oxygen showing on the dial—all to be done prior to pushing "test" button as will appear hereafter.

The analyzer 185 has a dial 192 with a pointer 193 to indicate the amount of oxygen present in the sample. The pointer moves to the right as the percentage of oxygen increases, up to the 21.8 percent of oxygen present in normal atmosphere. The analyzer senses the presence of oxygen, and sends out electric signals the amplitude of which varies with the amount of oxygen present. Amplifying means cause the relay energizers 200c–203c to be operated sequentially by these signals as the percentage of oxygen changes, the relay 200c being set to operate when the oxygen content is above 10 percent, the relay 201c when it is above 8 percent; the relay 202c when it is above 6½ percent and the relay 203c when it is above 5 percent. These values are chosen as suitable for a normal operation but other values may be chosen.

The control box includes a high voltage transformer 206, the secondary conductors of which pass through the conduit 154 to the various grids as indicated in FIG. 19. Other appropriate controls may be located in the control box, such as the distributor motor speed adjuster and cut-off control 211 to the master cut-off control and the like, a fuse reset 212, and a feeder motor 75 and 110 volt supply connector 213 to enable the apparatus to be connected and disconnected at will to a source of electric power.

FIG. 26 is a schematic wiring diagram of the mechanism. The two power lines brought in at 213 are designated 220 and 221. They are controlled by a suitable number of master switches, such as those shown at 215, 216 and 217, the first being a manually operable switch and the latter two being operated by the doors 67a and 67b. It is assumed that at the start these switches are all closed. The power line 220 is connected to normally closed stop switch 222, and also to one side of a normally open relay switch 223a.

The stop switch 222 being normally closed, power introduced by the line 220 is applied to a wire 225. From the wire 225, power is conducted to a normally opened test switch 226, thence to a normally closed relay switch 238a and from that switch to a relay coil 228c, the other side of which is connected to the other power wire 221.

When energized, this coil 228c closes two normally open, relay switches. One such relay switch 228a is connected in parallel with the test switch 226 to cause the coil 228 to be held in circuit after momentary closing and reopening of the test switch 226. The coil 228c also closes a second relay switch 228b in a starting circuit to be described.

Closing the test switch 226 or the relay switch 228a connects a wire 230 to the power line 220. This energizes two explosion-proof lamps 231 within the chambers 32 and 33, respectively, to provide illumination therein. The panels of these two chambers should be provided with windows for facilitating viewing inside. Energizing the wire 230 also energizes a lamp 232 on the front panel of the control box 149 and simultaneously supplies power to operate the sample pump 187. The lamp 232 shows that the pump is energized.

The solenoid valves 175 and 183 are also energized when the wire 230 is energized. The valve 175 then admits $CO_2$ into the interior of the control box 149, to render the atmosphere therein non-explosive. The valve 183 opens the pipe 186 between the filter 181 and the analyzer 185, enabling the sample pump 187 to draw the sample through the analyzer. The pump 187 acts to block entry from the other side of the analyzer. It will be observed that the pump 187 and the valves 183 are connected in parallel, so that as soon as the pump starts, the valve opens to permit the pump to draw the sample.

The oxygen analyzer 185 operates the energizer 200c–203c as hereinbefore identified. The relay 200c is energized across the wires 230 and 221 when the oxygen content exceeds a maximum, such as 10 percent of the sample atmosphere. The energizer 201c is put across the same line when the oxygen content exceeds a lower amount such as 8 percent; the energizer 202c is put across these lines when the oxygen content exceeds 6½ percent; and the energizer 203c is put across these lines when the oxygen content exceeds 5 percent. It is not necessary to explain in detail the structure of these electronic relays as they are commercially known. They operate certain switches also diagrammatically indicated in the manner to appear.

The line 225 leading from the normally closed stop switch 222 connects to a normally open start switch 235. The start switch 235 is in turn connected to the normally open relay switch 228b operated by relay coil 228c, and thence to the analyzer switch 200a which has already been described as closed by the switch 200c when the oxygen content of the sample atmosphere exceeds 10 percent.

If the test circuit has been operated, the relay switch 228b closed by the coil 228c and the relay switch 200a is closed, because the oxygen content exceeds 10 percent, the power is carried to a wire 236. This puts the relay coil 238c in circuit, which opens the relay switch 238a in the test circuit, closes the relay switch 238b in the analyzer circuit, and closes the relay switch 238d in a holding circuit for the operating circuitry, bypassing the start switch 235. This holds the relay coil 238c in circuit also.

At this time power also is brought to the normally closed, but now open, analyzer switch 200b. This switch 200b connects to a relay coil 237c and the line 211. This circuit can thus energize the relay coil 237c, which, as will appear, controls the energization of the grids and feeder mechanism. And it is also noted that the coil 237c, being de-energized, leaves closed the normally closed switch 237b, and de-energizes the warning light 241 and horn signal 240.

The line 236 brings power to the electronic relay switch 201a which is normally closed by the analyzer when the oxygen content is about 8 percent. With the switch 201a closed, power is introduced through the relay coil 243c to the line 221. This closes the switch 243a. Closure of the switch 201a also introduces power to a light 244 and to the solenoid valve 168 which is opened. The light 244 on the front panel of the control box indicates that this valve 168 is opened, and $CO_2$ is being admitted to one side of the machine. The holding circuit through the relay coil 243a is usually energized at this point because the relay switch 202a is closed, establishing the holding circuit through the holding switch 243a.

This latter operation occurs because when the oxygen of the machine atmosphere exceeds 6½ percent, the analyzer relay 202c closes the switch 202a which connected the relay coil 246c across the lines 236 and 221, and that coil closes the two switches 246a (just referred to) and 246b.

Closure of the switch 246b in response to an oxygen content above 6½ percent connects the relay coil 247c across the lines 236, 221. It also puts the other solenoid valve 172 and its indicating light 248 on the control box panel across those lines. A holding circuit for these three parallel items can be established when the oxygen content is above 5 percent and the analyzer relay 203c closes the switch 203a during closure of the relay switch 247a by the coil 247c.

The circuit for the feeder and spreader motor 75 includes the relay switch 223a, the speed control 212, all in series across the power lines 220, 221. This circuit is under control of a relay coil 223c, which, in parallel with the grid transformer 206, is connected from the relay switch 237a to the line 221. The relay switch 237a is normally open, but is closed upon energization of the relay coil 237c, which requires the analyzer switch 200b to be closed. This occurs when the oxygen content is below 10 percent.

In some cases it is desirable to have an adjustable pitch or angle of slope for the grids. Such arrangement is shown in FIGS. 20 through 22. A plurality of grids 100a are illustrated. These may be the same as the grids 100 but are provided at their upper corners with pin holding plates 260, each such plate having an outwardly extending pin 261. Instead of the notches 130, the rails 96a, which correspond to the rails 96, have a plurality of arcuate saddles 263 that may be welded onto the plates for attachment to the angles 96a. As is evident from the drawings, these saddles 263a receive the pins 261 and support them against gravity but permit the pins to be lifted out for removal of the grids. The saddles permit the grids to be swung back and forth to different pitch angles.

Each grid on its lower edge has a rack 265. These racks project out from the side rails of the grids 100a. An adjusting rod 266 is slidably mounted through a front bracket 267 attached to the angle 251, and a rear bracket 268 mounted on the horizontal frame member. The rod 266 fits within the racks 265 on the grids 100a. For each grid the rod has two pins 269 and 270 to be disposed on the opposite sides of its rack 265. When the handle 271 on the rod 266 is pulled forwardly or pushed backwardly, it will swing all of the grids 100a in their respective saddles 263 and thus fix their angles of slope.

The handle 271 is outside the cabinet. The rod 266 has a plurality of teeth 273 on its under side near the forward end. There is an elongated slot 275 in the bracket 267. When the handle 271 is lifted, the teeth are disengaged from the bracket 267, enabling the rod to be pushed in or pulled out. When it reaches the desired position, it is thus lowered, and the teeth engage the bracket to hold the rod and the grids in their selected positions of adjustment.

OPERATION

The machine is to be inserted in a line of flowing grain, grits or even more finely divided material which can contain insects. The inlet collar 70 is designed to receive the material from the line and the hopper 49 to discharge the material back into the line. If preferred, the machine can be used for batch operation. The present machine is not intended to provide a means for separating out the dead insects from the material.

The material can flow, usually continuously, into the hopper 71 of the distributor. There it impinges upon the cone 83 and is deflected evenly outwardly toward the walls of the hopper. It falls upon the disk 77 which, as noted, has suitably adjusted sectorially shaped holes in it. The disk 77 is rotated by the motor 80 and discharges the material outwardly and downwardly from the center of the shaft 88 substantially evenly over the upper parts of the several inverted angles 85. The disks 77 are adjusted to provide holes of such size as to attain distribution as even as possible.

The finely divided material strikes the inverted channels 85 which have their walls at an angle steep enough to prevent the material from coming to rest thereon. Since the forward faces of the channels depend below the rear faces of adjacent channels, the material is directed by gravity downwardly and somewhat forwardly where it falls upon the grids. In the case of the foremost grid, the material is directed onto the surface of the grid by the depending sheet 97. In the case of the others, the material is prevented from excess bouncing by the fact that if it bounces too much, it will strike the under surface of an adjacent grid. However, if desired, sheets like the sheet 97 can be used for all of the grids to confine the material and cause it to flow substantially evenly downwardly over the grid surfaces.

The grids are long enough in the direction of flow to ensure that all of the insects therein will come in intimate contact with the conductor bars as the material flows down them. If the material is grain, the grid bars can be about one-eighth inch apart. However, if the material is more finely divided as in the case of flour, the grid bars should be closer, as for example, 0.050 inches apart, to ensure electrocution of all of the insects. The finer material needs the grids to be disposed at a steeper angle (see FIG. 20).

The material descends off the ends of the grids into the hopper 49 and returns to the line. It will be seen that there are baffles provided to prevent material from lodging on horizontal ledges and other surfaces.

Grids can be removed for servicing or replacing, after the wall panels are unscrewed from the frame and removed, by withdrawing the bolts 147, lifting the hold-on rods 145 and then lifting the grids out. If the adjustable grids are used, the adjusting rod is removed, and the grids can be withdrawn from the sockets 268. Cleaning can be effected by removing the front panels and the grids. Hinging the upper left door panel 67a down, gives access to the spreader and gear box 80 for servicing, and hinging the door panel 67b upward, along with the baffle 93 attached to it, gives access to the tops of the angles 85 for cleaning. As noted, these doors are normally bolted in place.

The automatically controlled operation of the machine will now be described.

At the start it is assumed that the machine has an ambient air atmosphere inside and that a source of $CO_2$ is connected in through the valve 163 to the pipe 165. It is also assumed that the normally closed switches in the diagrammatic view FIG. 26 are closed and the normally open ones are open. It is also assumed that a master switch is closed connecting the two power lines 220 and 221 into the machine.

At the start operating the start switch 235 without prior operation of the test switch 226 will not produce any results because the relay switch 228b in series with the start switch 235 is open as the relay coil 228c is not energized.

Also at the start, the motor 80 of the feeder and distributor is inoperative because the motor relay 223c is not in circuit, as the relay switch 237a is open. This relay cannot be operated until the oxygen content falls below the danger level, and the analyzer recloses switch 200b. For the same reason the transformer 206 that energizes the grid is out of circuit. Before starting, the oxygen analyzer 185 should be calibrated to the line voltage, by adjusting the knob 193b until the pointer registers at a zero position in air.

To start the machine the test button switch 226 is closed, establishing a circuit from the line 220 through the normally closed stop switch 222, the test switch 226, the normally closed relay switch 238a and the relay coil 228c to the line 221. Energizing the relay coil 228c causes the closure of the two relay switches 228a and 228b. The relay switch 228a provides a holding circuit around the test switch 226 which thereby can be released without de-energizing the coil 228c.

The foregoing also connects the wire 230 to the line 220 and holds it so connected. This does a number of things. It energizes the two illuminating lamps 231 inside the cabinet. It starts the sampling pump 187 and illuminates the lamp 232 on the panel showing that the pump is operating and that the starting circuit has been energized. It also energizes the solenoid valve 175 which is so opened to release $CO_2$ into the control cabinet, to prevent any explosion therein. At the same time it energizes the solenoid valve 183 which opens the sampling line to permit the sampling pump 187 to draw air from inside the machine cabinet through the oxygen analyzer 185 and ultimately discharge it back into the cabinet thus saving in volume and cost of $CO_2$ gas. The relays 200c–203c are also put into circuit. Since at this time, the oxygen content of the sample is approximately the 20 percent of the atmosphere, the four analyzer relays 200c–203c are all in the "energized" state with the results to be described.

At this point the starting switch 235 can be closed. Power then is introduced from the wire 225 through the starting switch 235 to the relay switch 228b. As noted, this switch is closed by energization of the relay coil 228c when the test circuit is operated. Since it is closed, power is introduced to the switch 200a. The energizer 200c closes the switch 200a and opens the switch 200b whenever the oxygen content of the sample exceeds 10 percent. Therefore, it is energized at the start and the switch 200a is closed, and power is introduced to the line 236. The relay switch 200b being now open, the circuit to the relay coil 237c is broken.

Power from the line 236 is introduced to the relay coil 238c and thence to the other line 221. Energizing the coil 238c closes the relay switch 238d and establishes a holding circuit to maintain the wire 236 hot so long as the relay coil 238c remains energized, despite opening of the starting circuit through switch 235.

When the wire 236 is thus hot, power is still kept away from the transformer because the relay switch 237a is open. Power does flow, however, through the normally closed relay switch 237b to the warning light 241 and the audible signal 240. These warning signals indicate that the machine is capable of functioning but has a hazardous internal atmosphere.

With the oxygen content still above 10 percent, all of the four analyzer energizers 200c–203c are in the energizing condition. Accordingly, the switch 201a is closed by its energizer 201c which latter remains in the energized state so long as the oxygen content exceeds about 8 percent. Under these circumstances, power is introduced from the wire 236 to the relay coil 243c, the lamp 244, and the solenoid valve 168. The lamp indicates that the solenoid valve 168 is open admitting $CO_2$ to the top of the machine cabinet by way of the pipe or nozzle 169. The oxygen content will then begin to drop.

Energization of the relay coil 243c by the aforesaid circuitry closes the relay switch 243a in a holding circuit for the three items 243c, 244 and 168. This holding circuit, however, is dependent upon closure of a relay switch 246a. This latter closes whenever the switch 202a is closed, because the line 236 is connected through the analyzer switch 202a to the coil 246c of the relay 246a. The analyzer switch 202a is closed by its energizer 202c whenever the oxygen content exceeds about 6½ percent.

Energizing the relay coil 246c by means of the analyzer switch 202a also closes a switch 246b to connect a relay coil 247c, a lamp 248 and the solenoid valve 172 into circuit. The lamp 248 thus indicates that the solenoid valve 172 is open and that $CO_2$ is being discharged through it by way of the other pipe or nozzle 173 to the top of the machine receptacle. Energization of the relay coil 247c closes a switch 247a which is in series with the analyzer switch 203a to establish a holding circuit for the three elements 247c, 248 and 172, so long as the energizer 203c of the oxygen analyzer is in the energized situation which is true whenever the oxygen content is above 5 percent.

At this stage of the process, there is no flow through the machine, the spreader motor 80 is not operating, the grids are not energized, the oxygen analyzer 185 is operative, the sampler pump 187 is continuously drawing sample through the analyzer, the warnings are operating, $CO_2$ is being supplied to the control cabinet and is also being supplied through the two pipes to the top of the machine cabinet. Accordingly, the oxygen content of the atmosphere within the cabinet is being lowered.

In due course, the oxygen content will drop below 10 percent. This de-energizes the energizer 200c, and that in turn opens the switch 200a and permits reclosure of the switch 200b. Opening of the switch 200a maintains the starting circuit open so that even if the starting switch 235 is again depressed, the machine cannot be started thereby. Upon power failure, for example, the starting circuit could not be restarted until the machine had rested long enough for the oxygen content of the cabinet to rise again to above 10 percent and a new starting cycle to be instituted. However, although the energizer 200c has become deenergized, the relay switch 238d, which is a holding switch for the relay 238c, does remain energized, so that the line 236 remains hot. Consequently, when the oxygen content drops below 10 percent and the switch 200b is again closed, the relay coil 237c is energized. This closes the relay switch 237a and simultaneously opens the normally closed relay switch 237b. This latter opens the circuit to the visual and audible alarms 240 and 241 which then stop operating.

Closure of the relay switch 237a puts the transformer primary in circuit to energize the grids. It also energizes the relay coil 223c which closes the motor relay switch 223a and starts the spreader feed motor 80 at a speed fixed by the adjustment 212. Material then starts to pass through the machine and does so in an atmosphere that is below the combustion state. Normally this is below 10 percent oxygen. $CO_2$ continues to flow through both pipes or nozzles into the top of the cabinet, as well as into the control cabinet.

When the oxygen content within the machine cabinet falls below 8 percent, the oxygen analyzer energizer 201c is de-energized. This opens the switch 201a which leads to the solenoid valve 168 controlling one of the $CO_2$ inlets to the top of the machine cabinet. However, with the oxygen content still near to 8 percent and above 6½%, opening of the relay switch 201a has no immediate effect on the system, because the holding circuit through the switches 246a and 243a remains closed and will remain closed as long as the oxygen content exceeds 6½ percent.

When the oxygen content declines below 6½ percent, the analyzer actuator 202c causes the switch 202a to open. This de-energizes the relay coil 246c and opens the switches 246a and 246b. Opening the switch 246a breaks the holding circuit to the relay coil 243c and also de-energizes the solenoid valve 168 to one of the $CO_2$ inlet pipes or nozzles through the machine cabinet. Consequently, when the oxygen content is lowered to 6½ percent, the inflow of $CO_2$ is limited to one inlet pipe or nozzle. We may note that if the oxygen content rises again above 6½ percent, the unit 202c will reclose the switch 202a, re-energizing the coil 246c. However, the circuit to the first solenoid valve 168 cannot reclose. This arrangement prevents hunting of that valve at around 6½ percent oxygen.

If the oxygen content falls below 5 percent, the analyzer relay energizer 203c operates to open the switch 203a. This opens the holding circuit to the relay coil 247c and also to the other $CO_2$ inlet valve 172, which valve then closes, cutting off all inflow of $CO_2$ to the machine cabinet. It will be noted that the $CO_2$ valve 183 remains open under control of the coil 238c acting on the switch 238b so that there is a continuous supply of $CO_2$ to the control box cabinet.

Throughout the cycling of the machine, the coil 238c remains energized and consequently its holding switch 238a remains closed, until and unless the stop switch 222 is opened or power is cut off. Assuming that switch is not operated, and that after the closing of both $CO_2$ valves the air within the machine cabinet increases in oxygen content, the following will occur. As the oxygen content rises above 5 percent, the switch 203a will again be closed but this cannot produce any result because the switch 247a is now open as is the switch 246b. This prevents hunting at the 5 percent condition. If the oxygen content then rises to above 6½ percent, the switch 202a again is closed by its energizer 202c. This re-energizes the coil 246c, closing the switch 246b, re-energizing the coil 247c, and restoring the circuit to open the valve 172. Thus, the valve 172 will cycle open when the oxygen content is above 6½ percent and close when the oxygen content falls to below 5 percent.

The reclosing of the switch 246a upon the foregoing re-energization of the coil 246c will have no effect on the other solenoid valve 168 because the switch 243a is at this time open as also is the switch 201a. The first solenoid valve 168 will not reclose until the oxygen content rises above 8 percent, thereby actuating the actuator 201c to cause the switch 201a to be closed. Once this condition exists, however, the holding circuit through the switches 246a and 243a will hold the solenoid 168 open until the oxygen content drops below 6½ percent, so that the actuator 202c reopens the switch 202a and in turn causes the switch 246a to open. Thus the second solenoid valve 168 cycles between oxygen contents of 8 percent and 6½ percent.

In summary of the operation, beginning with normal atmosphere in machine cabinet above 10 percent oxygen:

1. To start, first operate test switch 226. This starts sampler-analyzer, 185 by pump 187, through valve 183, supplies power to energizers, 200c–203c and $CO_2$ to control cabinet at 183; this also cocks running circuits at 228b.
2. Then operate start switch 235.
Only if test circuit has closed 228b and oxygen is above 10 percent to close 200a, will the starting circuit be operative to supply power to wire 236. Once operated by start switch, wire 236 remains hot by 238c–238d, until stop switch 222 is opened. Alarms 240, 241 operate. Both solenoid valves 168, 172 open. Sampler circuit held through 238b.
3. Machine cabinet atmosphere drops below 10 percent oxygen: 200c de-energized:
Starting circuit blocked at 200a. Grids and feeder started by 200b reclosing and energizing 237c, closing 237a. Warnings 240, 241 stop as 237b is opened. (Subsequent return of oxygen above 10 percent restarts alarms, stops grids and feeder. Hunting does not occur because all of this time both solenoid valves are open, and $CO_2$ is flowing in, making the rise in oxygen content at this time wholly unlikely.)

4. Machine cabinet atmosphere drops below 8 percent oxygen:

Nothing happens at this time except that 201c is deenergized and 201a opens, but the hold circuit for valve 168 stays closed.

5. Machine cabinet atmosphere drops below 6½ percent oxygen: 202c de-energized.

Solenoid valve 168 closes, cutting off one source of $CO_2$ to the machine cabinet, because 202a opens, 246c is de-energized, 246a opens and holding circuit for 168 is broken. (Subsequent rise of oxygen above 6½ percent recloses 202a and energizes 246c, closing 246a. But 243a is open, so valve 168 cannot be re-opened until the oxygen content rises to 8 percent, reclosing 201a. So valve 168 cycles between 6½ percent and 8 percent oxygen.)

6. Machine cabinet atmosphere drops below 5 percent oxygen: 203c is de-energized.

Solenoid valve 172 closes, cutting off other $CO_2$ source to the machine cabinet, because 203a opens, breaking holding circuit for the solenoid valve. (The machine operates thus until the oxygen content rises. Rising to just above 5 percent recloses 203a, but this has no effect. Hence hunting does not occur. Only upon rise to 6½ percent with reclosing of 202a, 246b does solenoid valve 172 reopen. So valve 172 cycles between 5 and 6½ percent oxygen.)

7. To stop machine, open stop switch 222. Everything stops.

In describing the operation, reference has been made to $CO_2$. It is the preferred combustion-suppressing gas, but others known in the art may be used, with appropriate adjustments. It is notable that the machine does not stop material flow even when inoperative. Even stopping the spreader will not prevent flow entirely. But only power failure or a deliberate stopping of the machine stops the spreader.

I claim:

1. In an insect electrocuting machine: a housing cabinet; a plurality of sloping grids in the cabinet, all sloping in the same direction downwardly and laterally in parallel spaced relation one behind another; grain distribution means above the tops of the grids, to deliver grain to the upper ends of the grids, and a collecting means below all of the grids to accumulate the grain descending from them; each of the grids providing oppositely charged conductors that can provide electrical energy to kill insects in the spaces adjacent the conductors.

2. In the machine of claim 1: the grids having a rockable mounting on the housing at one of their ends to permit their slope to be changed, means to swing the other ends of the grids about the mountings, and means to hold the grids in selected positions.

3. In the machine of claim 1, the grain distribution means including a plurality of baffles in the housing across the tops of the grids affording slots, one above the top of each grid, through which grain may pass to the grids; and distribution means above the baffles incorporating grain spreading means to receive grain from a stream and spread it over the baffles and to deliver grain downwardly onto the baffles and through the several slots.

4. In the machine of claim 1, means in the housing to support the baffles removably in the cabinet; and a means in the cabinet wall removable to give access to the grids for their removal.

5. In the machine of claim 1: the grain distribution means including a plurality of flange elements arranged in spaced relationship across the housing in an inverted V-like disposition, comprising first flanges extending downwardly and in the direction of one of the grids and second flanges extending downwardly and oppositely to deflect material downward and toward the first flanges of an adjacent grid, the lower edges of the first flanges extending lower than the second flanges and over the upper ends of the grids.

6. In the machine of claim 1: the housing cabinet having two side rails in the grid area, one along each side of the housing, and the grids have elements adjacent to their upper ends at their sides and removably interengaging with the two side rails, the several grids being connected to the two side rails in sequence along the rails from the rear toward the front of the rails, and releasable means to secure the lower ends of the grids to the housing.

7. In the machine of claim 1: each grid having the conductors spaced by solid material molded between them, non-conducting side rails and a non-conducting bottom.

8. In the machine of claim 1: the housing cabinet having sheet sides and top to enclose the interior, and hinged doors adjacent the upper end openable to give access to the interior for servicing.

* * * * *